Figure 1:
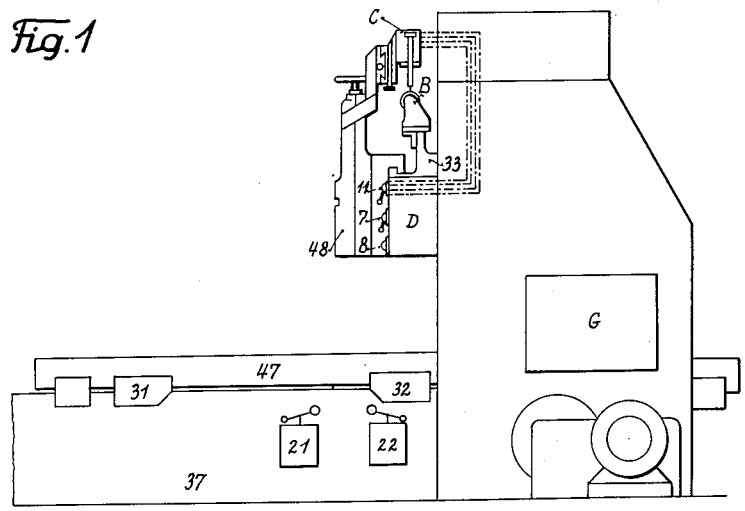

July 31, 1956 H. PRÄHAUSER 2,756,643
DEVICE FOR PRODUCING AN INTERMITTENT MOVEMENT, PARTICULARLY
THE FEEDING MOVEMENT IN CONNECTION WITH MACHINE TOOLS
Filed Nov. 16, 1951 3 Sheets-Sheet 1

INVENTOR.
HEINRICH PRÄHAUSER

INVENTOR.
HEINRICH PRÄHAUSER

INVENTOR.
HEINRICH PRÄHAUSER

United States Patent Office 2,756,643
Patented July 31, 1956

2,756,643

DEVICE FOR PRODUCING AN INTERMITTENT MOVEMENT, PARTICULARLY THE FEEDING MOVEMENT IN CONNECTION WITH MACHINE TOOLS

Heinrich Prähauser, Langenzersdorf, Vienna, Austria, assignor to Maschinenfabrik Heid Aktiengesellschaft, Vienna, Austria, a joint-stock company of Austria Application November 16, 1951, Serial No. 256,691

Claims priority, application Austria December 1, 1950

3 Claims. (Cl. 90—49)

The invention relates to a device for producing an intermittent movement, particularly the feeding movement in connection with machine tools.

The intermittent feeding movement of the tool holding means of machine tools, such as planing machines, shaping machines, slotting machines, surface grinders, milling machines, or the like, is brought about by means of mechanical intermediate members, such as cranks, ratchets, links, curve discs, or the like, and e. g. with planing machines is derived from the main drive of the planing-machine table moved to and fro. In the latter case during each reversion of the table a vertical shaft arranged in the stand of the machine is caused to rotate with a jerk, alternately to the right and to the left, and actuates through the gear case provided at the end of the cross beam which carries the tool holding slide rest, by means of crank links, control ratchets, or the like, the feed shaft in said cross beam. These mechanical intermediate members enable the extent of the feeding movement to be adjusted, they are, however, disadvantageous for use in modern, high speed machine tools, principally in view of the required acceleration of their masses.

It has likewise already become known to make the actuation of the feed shaft, or of the slide rest, independent of the main drive, and to effect the same by a reversing magnetic clutch actuated by a special motor, said clutch being, on the one hand, by means of a suitable transmission gearing, connected to a motor rotating permanently, with a constant number of revolutions, and, on the other hand, with the feeding shaft. With this known arrangement the control of the reversing magnetic clutches for the vertical and horizontal feed of the tool, e. g. with planing machines, is effected by means of electro-magnetic relays which are either to be actuated by hand by means of switches, or are automatically controlled by a tracer device with the aid of templates. For altering the extent of the feeding movement of the slide rest, at a time, i. e. for limiting the time of duration of the exciting current supplied to the magnetic clutch by means of the relay, there serves a special device in the known arrangement. Said device comprises a switching drum coupled by means of a reduction gear with a motor, said drum being provided at its circumference with a metal coating which covers almost the whole circumference of said drum in the longitudinal direction at one end of the same, and which runs to a point at the other end. By moving a brush provided within the control circuit of the relay along the drum, there may thus be altered, or adjusted, the duration of the control current of the relay, and, furthermore, the duration of the switching in of the magnetic clutch during one rotation of the drum between a maximum value and a minimum value. By a friction coupling arranged between the drum and its drive, the drum is stopped after each rotation by means of a pawl engaging the only single tooth gap of its ratchet wheel, said pawl being actuated by a magnet excited by means of a further relay.

The device above described thus constitutes a mechanical time-delay relay of a comparatively complicated construction, which is therefore liable to disturbances and which, in consequence of the interaction of a great number of individual movable parts, does not enable with the constancy required the frequently desired short switching time.

These drawbacks are removed by the present invention. The device for producing an intermittent movement, particularly the feeding movement in connection with machine tools, by means of a magnetic clutch rotating with constant speed for the drive of the feeding device, e. g. the feed shaft of the compound slide rest, is, according to the invention, characterized in that the time-delay or timing relay is a steplessly adjustable, electronic time-delay relay known per se. Such a relay does not contain any movable parts, and enables the reduction of the switching time of the magnetic clutch to magnitudes between several tenths and several hundredths of a second, while maintaining an absolute constancy.

Figure 2:
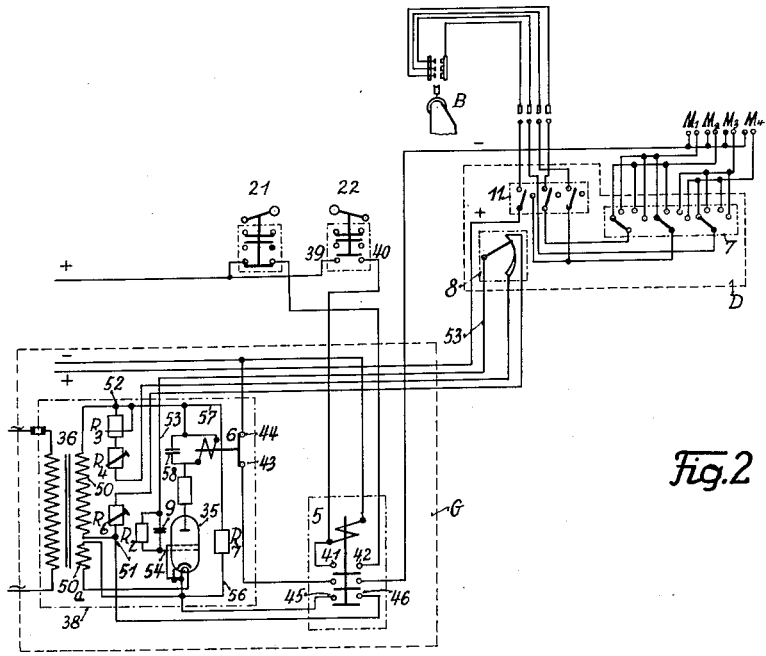
Figure 3:
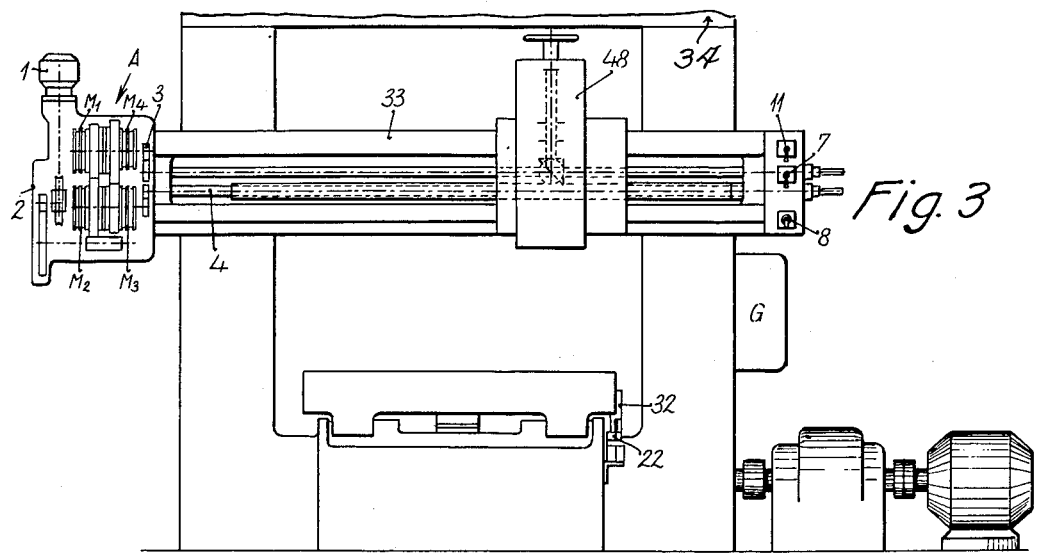
Figure 4:
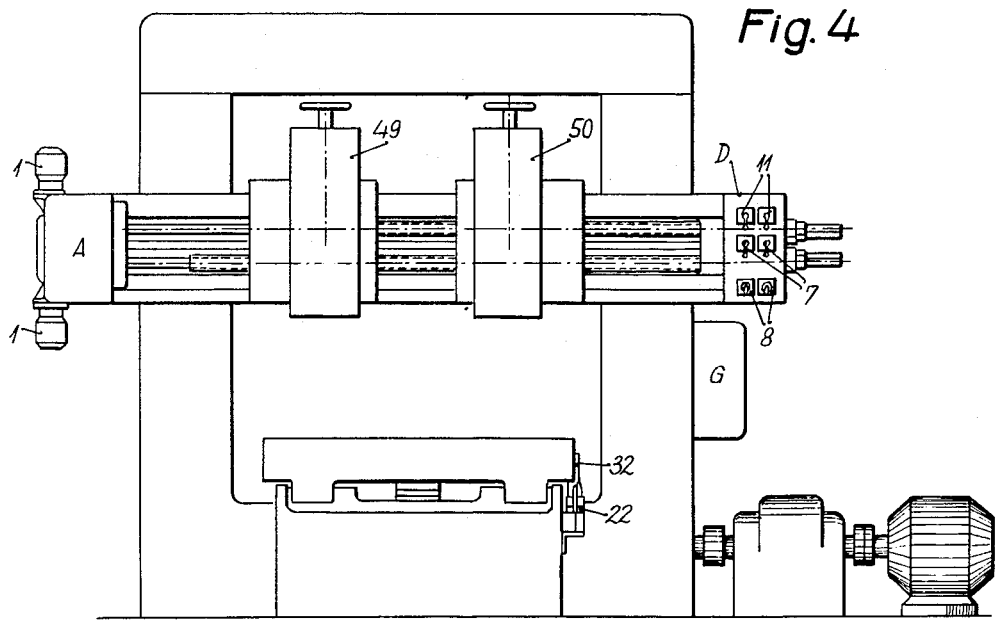
Figures 5, 6:
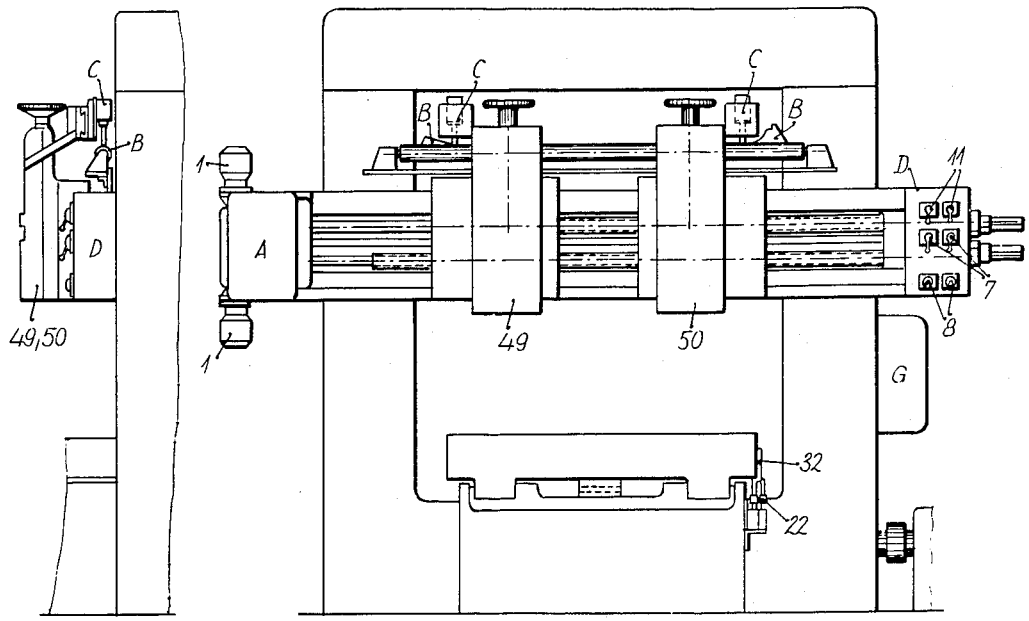

Various embodiments of the invention are shown, by way of example, in the drawings, in which Figs. 1 to 3 schematically illustrate an embodiment of the present invention in connection with a parallel planing machine having one single slide rest for the selective control of four magnetic clutches for obtaining the four movements of the slide rest "to the left," "to the right," "upwards," "downwards," Fig. 1 being a side view of the parallel planing machine, Fig. 2 showing the electronic time-delay relay used by way of example and the connection of the clutches therewith and with an electric tracer control device for automatically planing (copying) profiles upon parallel planing machines, Fig. 3 being a front view of the parallel planing machine, wherein, however, the tracer control device has been omitted, Fig. 4 a similar view of an embodiment with two slide rests, and Figs. 5 and 6 being a front view, and partial side view, respectively, of a similar embodiment with a tracer control device.

The motor 1 (Fig. 3) running at a constant number of revolutions drives, through a reduction gear 2, the electromagnetic clutch M1 in the gear case A, which is connected directly, or through a gear drive 3 provided in said gear case, with the feed shaft 4 arranged in the cross beam 33 of the planing machine 34. The clutch M1 is actuated through the switch 7 (viz likewise Figs. 1 and 2) by the switch 5 which, in addition, effects, through contacts not illustrated, the reversion of the planing-machine table, so that the shaft 4 is rotated during the reversion of the table and moves the slide rest. The extent of the feeding movement desired is dependent on the switching time of the time-delay or timing relay 38 which is adjusted accordingly again to disconnect the clutch M1.

The feeding movement is thus brought about at a constant speed, independent of the speed of the table. In order to alter the switching time of the clutch M1, and thus the extent of the feed, an electronic relay 38 of a construction known per se is, in accordance with the present invention, used as an adjustable time-delay relay, wherein a condenser 9 after having been charged, is discharged through an adjustable resistance 8, by means of which the time of discharge may be changed. Thereby the difference between the voltage of the charged and of the discharged condenser is used for controlling a thyratron valve 35 which causes the relay 6 to respond after the expiration of the time of discharge, and thus to disconnect the magnetic clutch M1. In Fig. 2 the transformer 36 is shown which supplies current to the electronic relay.

Figs. 1 to 3 show the change-over switches 21 and 22 on the bed 37 of the planing machine, as well as the table stops 31 and 32, and the case G wherein the electronic time-delay relay 38 and the relay 5 are housed. If the table stop 32 passes over the switch 22, before the end of the return movement of the table, the contacts 39, 40 of said switch which connect the relay 5 are thereby closed. The contacts 41, 42 of the relay 5 are first of all closed connecting, through the closed contacts 43, 44 of the relay 6, the clutch M1, M2, M3, or M4, according to the position of the switch 7. The relay 5 simultaneously closes contacts 45, 46 which the time-delay relay has brought to function, said relay connecting, after a determined period, the relay 6, thus disconnecting clutch M1, M2, M3, or M4. The time from the connection of the relay 5 to the switching operation of the relay 6 is steplessly adjustable by the resistance regulator 8 which is arranged in the case D. Before the end of the forward movement of the table 47 the table stop 31 passes over the switch 21, whereby the relay 5 again falls off. Thus, after the return of the table, the play may start again with the operation of switch 22.

The mode of operation of the electronic time-delay relay 38 is as follows reference being made to Fig. 2. It is supposed that the contacts of the relay 5 are open. Between the points 51, 52 there prevails the alternating potential supplied by the secondary winding 50 of the transformer.

In the circuit constituted by the potentiometer 8, by the conductor 53, by the resistor $R_2$, by the conductor 54, by the grid, by the cathode of the tube 35, by the conductor 56, by the resistor $R_7$, by the conductor 57, by the adjusting resistors $R_3$, $R_4$ and by the potentiometer 8, an alternating current is flowing which effects the charge of the capacitor 9; the direction has been arbitrarily chosen. The part of said capacitor connected to the conductor 54 becomes negative, and thus no anode current is possible. The tube 35 is non-conductive.

Let it be supposed that the contacts 45, 46 of the relay have been closed by the action of the table stop upon the switch 22 whereby at the same time the electromagnetic clutch is connected through the likewise closed contacts 41, 42. While previously the cathode had been connected to point 52, it comes now to contact point 51. The current circuit is passing from the contact 45 to the cathode, to the secondary winding 50a, to the conductor 56, to the resistor $R_7$, further from the point 52 over the resistors $R_3$, $R_4$, 8, $R_6$ to the point 51 and from here to the contact 46.

The grid current fails to appear, because the cathode is now always more positive than the conductor 53. In consequence of the lacking grid current, the capacitor starts to be discharged through the resistor $R_2$, the previously negative potential of the conductor 54 rising up to zero. The periodically fading out discharge potential is superposed by the alternating potential of the conductor 53, wherefrom after a given time the ignition voltage is resulting which makes the tube conductive. A further consequence is the responding of the relay 6 which disconnects the electro-magnetic clutch. The capacitor 58 acts as a damping means. The adjusting resistors $R_3$, $R_4$ and $R_6$ serve for the calibration of the time relay.

The case D is fastened to the planing machine near the place of attendance. In said case D there is, moreover, provided the switch 7 for adjusting the direction of feed, for instance connecting the clutch M1 for the motion to the left, the clutch M2 for the downward motion, the clutch M3 for the motion to the right, or the clutch M4 for the upward motion.

The invention is also applicable to electric tracer control devices, e. g. for automatically planing profiles by means of templates (copying) upon parallel planing machines, as is likewise schematically indicated in Figs. 1 and 2. By the scanning tracer C secured to the vertical slide 48 and guided over the profile template B fastened on the cross beam 33 of the machine, the clutches will receive impulses of varying duration depending on the way of the tracer according to the shape of the profile, so that the tool performs a movement identical to said shape. The switch 11 in the case D serves for connecting, or disconnecting, the copying movement. By scanning the template B, which is e. g. performed in accordance with U. S. specification 2,523,918, the clutches M1, M2, M3, or M4, are intermittently connected, according to the shape of the template, through contacts cooperating with the tracer.

Fig. 4 shows an arrangement for the feed connection of two slide rests 49 and 50, which requires all the elements in duplicate. Thus in the case D there are e. g. provided two switches 11, two feed regulators 8, and two switches 7 for connecting, or disconnecting, the movement of the slide rest. In the feed case A there are, furthermore, provided two clutches M1, two clutches M2, two clutches M3, two clutches M4, and, likewise in duplicate, the gear elements already mentioned in connection with the previously described embodiment.

Figs. 5 and 6 illustrate a further modification, wherein the last described planing machine is provided with tracer control device for bringing about a control of the feed of the two slide rests 49 and 50. There are provided templates B and tracers C, similar to the illustrations in Figs. 1 and 2, for a slide rest. In this case there are naturally required two tracers C and two templates B. The remaining parts of the machine are constructed in similar, or corresponding, manner as those of the previously described embodiments. In the illustrations like parts have been denoted by like reference characters in accordance with the previously described figures.

Due to the time-delay relay the feeding movements during the reversion of the table can take place within the time only which is determined by the time-delay relay. Thus, the maximum feed per stroke has only a duration corresponding to the time-delay of the time-delay relay, e. g. 0.7 second as a maximum, the feeding speed being constant.

It will be understood from the above that the present invention is not limited to the elements, members, steps and arrangements specifically described above and re-instated in the drawings and can be carried out with various modifications without departing from the scope of the invention, as defined in the appended claims.

What I claim is:

1. In a metal working machine including a frame, the combination comprising a table reciprocating on the frame, tool feeding means movably mounted on the frame, at least one electromagnetic clutch mounted on the frame, for driving the feeding means, a source of direct current, a relay connected by a stroke of the table to the source of direct current, and thereby energized to connect the source of direct current to the clutch for starting the tool feeding movement, an electronic timing circuit, a source of alternating current connected by the energized relay to the electronic timing circuit simultaneously with establishing the connection of the clutch with the source of direct current, said electronic timing circuit disconnecting the clutch from the source of direct current after a predetermined time interval for stopping the feeding movement.

2. In a metal working machine including a frame, the combination comprising a table reciprocating on the frame and including engaging means, tool feeding means movably mounted on the frame, at least one electromagnetic clutch for driving the feeding means, switches carried by the frame and each closed by the engaging means during a certain movement of the table, a source of direct current connected to the switches, a relay connected to the switches and energized when one of the switches is closed and including a contact connecting the clutch to the source of direct current, when the relay is energized and further including a second contact, a source of alternating current, electronic timing means connected to the source of alternating current by the second contact of the energized relay simultaneously with establishing the connection between the clutch and the source of direct current, said timing circuit including a grid, a capacitor connected to the grid, a variable resistance in series with the capacitor, said timing circuit breaking the connection between the clutch and the source of direct current for stopping the feeding movement after a time interval determined by the setting of the variable resistance.

3. The combination according to claim 2 and comprising a plurality of electromagnetic clutches each driving the tool feeding means in an individual direction, and a switch connecting a selected electromagnetic clutch to the source of direct energy.

References Cited in the file of this patent

UNITED STATES PATENTS

| | | |
|---|---|---|
| 1,321,203 | Greenleaf et al. | Nov. 11, 1919 |
| 1,490,412 | Blood | Apr. 15, 1924 |
| 2,262,399 | Shaw | Nov. 11, 1941 |
| 2,369,243 | Lechler | Feb. 13, 1945 |
| 2,377,365 | Pardey et al. | June 5, 1945 |
| 2,412,337 | Jackson | Dec. 10, 1946 |
| 2,537,269 | Harding | Jan. 9, 1951 |